United States Patent [19]

Kobayashi et al.

[11] Patent Number: 4,890,458
[45] Date of Patent: Jan. 2, 1990

[54] REFRIGERATING CIRCUIT FOR CAR AIR CONDITIONING

[75] Inventors: Hisao Kobayashi; Katsunori Kawai; Masayuki Tanikawa; Hiroyuki Deguchi, all of Kariya, Japan

[73] Assignee: Kabushiki Kaisha Toyoda Jidoshokki Seisakusho, Aichi, Japan

[21] Appl. No.: 215,212

[22] Filed: Jul. 5, 1988

[30] Foreign Application Priority Data

Jul. 6, 1987 [JP] Japan .................................. 62-168334

[51] Int. Cl.⁴ ............................................... F25B 1/00
[52] U.S. Cl. ........................................ 62/204; 62/227; 417/222
[58] Field of Search ...................... 62/228.5, 225, 204, 62/227, 228.3; 417/222.5

[56] References Cited

U.S. PATENT DOCUMENTS

| | | | |
|---|---|---|---|
| 3,260,064 | 7/1966 | Newton | 62/227 X |
| 3,913,347 | 10/1975 | Stevens | 62/227 |
| 4,102,150 | 7/1978 | Kountz | 62/209 |

OTHER PUBLICATIONS

Truxal, Control Engineers' Handbook 1958 pp. 18-23.

Primary Examiner—William E. Wayner
Attorney, Agent, or Firm—Burgess, Ryan & Wayne

[57] ABSTRACT

A closed refrigerating circuit for car air conditioning includes a compressor, a condenser, a refrigerant receiver, an expansion valve, and an evaporator. The expansion valve is provided with a constant pressure controlling mechanism for maintaining a pressure in the evaporator at a constant value. The compressor is provided with a continuously variable displacement mechanism for maintaining a superheating temperature of suction refrigerant at a constant value.

4 Claims, 3 Drawing Sheets

REFRIGERATING CIRCUIT FOR CAR AIR CONDITIONING

BACKGROUND OF THE INVENTION

1. Field of the Invention

The present invention relates to a refrigerating circuit for car air conditioning, and particularly, to an improvement of a refrigerating circuit having a continuously variable displacement refrigerant compressor.

2. Description of the Related Art

Generally, in a refrigerating circuit for car air conditioning, a refrigerant compressor is intermittently driven by an engine of the car to cope with changes in the cooling load of a car compartment. This intermittent operation, however, causes fluctuation of the torque of the engine, which leads to an uneven drive of the car and causes wear of a clutch disposed between the compressor and the engine. To solve this problem, a variable control of the displacement of the compressor has been proposed.

Two types of variable displacement mechanisms for the compressor are known, i.e., a stepwise variable type that selectively changes the displacement, and a continuously variable type that continuously changes the displacement, and it has been proposed that these mechanisms be used for the refrigerating circuit for car air conditioning.

FIG. 3 is a schematic view showing a conventional refrigerating circuit. In the figure, 10A denotes a compressor driven by, for example, a car engine, and this compressor 10A is produced with a discharge conduit 12 from which a refrigerant circuit is extended. Disposed in series in the refrigerant circuit are, a condenser 14, a refrigerant receiver 16, an expansion valve 18A, and an evaporator 20. A circuit comprising a suction conduit 22 extends from the evaporator 20 to the compressor 10A. The expansion 18A is a conventional thermostatic automatic expansion valve.

An equalizing pipe 24a transfers a refrigerant pressure at an outlet of the evaporator 20 to the expansion valve 18A, and the transferred refrigerant pressure acts on a spring of the expansion valve 18A to generate a resultant force. The resultant force is balanced in the expansion valve 18A by a saturation pressure of a thermosensitive cylinder 24b responsive to a refrigerant temperature at the outlet of the evaporator 20, to thereby adjust an opening of the expansion valve 18A. The expansion valve 18A maintains a superheating temperature of a suction refrigerant of the compressor 10A at a fixed value (about 10° C.).

The compressor 10A is provided with a continuously variable displacement mechanism and a valve device 10a. The valve device 10a detects a suction pressure of the compressor 10A and adjusts a discharge displacement of the compressor 10A accordingly, to thereby control the suction pressure to a constant value (about 2 atm).

In a typical refrigerating circuit for car air conditioning, the refrigerant compressor is arranged in the engine room, and therefore, contrary to an evaporator disposed in a passenger compartment, the compressor is greatly affected by heat. Particularly, in a front-engine front-drive (FF) car, a suction conduit must be extended from the evaporator located in the passenger compartment to the compressor located in front of an engine of the car, and this type of structure not only causes the compressor to be affected by heat but also causes a fluctuation of a flow of refrigerant passing through the suction conduit.

Therefore, even if a superheating temperature of the refrigerant at an outlet of the evaporator is controlled by an expansion valve of the type described above, external factors such as heat have an adverse influence on the suction conduit and cause substantial changes in the superheating temperature of the refrigerant to be sucked by the compressor. As a result, the temperature of the discharged refrigerant may be increased, and a cylinder of the compressor may be abnormally overheated.

The expansion valve does not control an evaporating temperature to a constant value but maintains a pressure difference between an evaporating pressure and a saturation pressure corresponding to the temperature of the refrigerant at the outlet of the evaporator, at a constant value. Therefore, the evaporating temperature (a temperature of conditioned air) cannot be stabilized, and further, part of the evaporator is always under a refrigerant superheated state and thus a cooling capacity of the refrigerating circuit is lowered.

SUMMARY OF THE INVENTION

An object of the present invention is to provide an improved controlling system for controlling an expansion valve and a compressor to improve the efficiency of a refrigerating circuit for car air conditioning, as well as improving an air conditioning of a compartment of the car.

To accomplish the object, the present invention provides a refrigerating circuit comprising an expansion valve provided with a constant pressure controlling mechanism that maintains a pressure in an evaporator at a constant value, and a compressor provided with a continuously variable displacement mechanism that maintains a superheating temperature of a suction refrigerant at a constant value.

An opening of the expansion valve is adjusted according to a balance between a pressure in the evaporator and a force of an adjustable spring of the expansion valve. The pressure in the evaporator is transferred to the expansion valve by an equalizing pipe that introduces an outlet pressure of the evaporator into the expansion valve, or by a refrigerant outlet of the expansion valve that directly introduces an inlet pressure of the evaporator into the expansion valve.

The compressor may be of any type, such as a wobble plate type, vane type, and scroll type, as long as it is provided with a continuously variable displacement mechanism. The continuously variable displacement mechanism operates in response to a superheating temperature of the suction refrigerant, i.e., a pressure difference between a saturation pressure in a thermosensitive cylinder disposed in the vicinity of the compressor and a suction pressure. A known valve device is used to detect this pressure difference.

According to the refrigerating circuit of the present invention, the expansion valve maintains a pressure in the evaporator at a constant value, and the continuously variable displacement mechanism of the compressor maintains a saturation condition in an entire area of the evaporator, thus stabilizing an evaporating temperature (a temperature of conditioned air).

Accordingly, the refrigerant at the outlet of the evaporator is in a saturated state or in a slightly wet state, and the wetness may vary slightly, but such variations, as well as changes in the superheating temperature due to external factors that influence the refrigerant passing through a suction conduit between the evaporator and the compressor, are detected and controlled by an adjustment of the continuously variable displacement mechanism of the compressor, so that overheating of the refrigerant discharged from the compressor, as well as the compressor per se, is prevented.

BRIEF DESCRIPTION OF THE DRAWINGS

These and other objects and features of the present invention will become apparent from the following description with reference to the accompanying drawings, in which.

DESCRIPTION OF THE PREFERRED EMBODIMENTS

Figure 1:
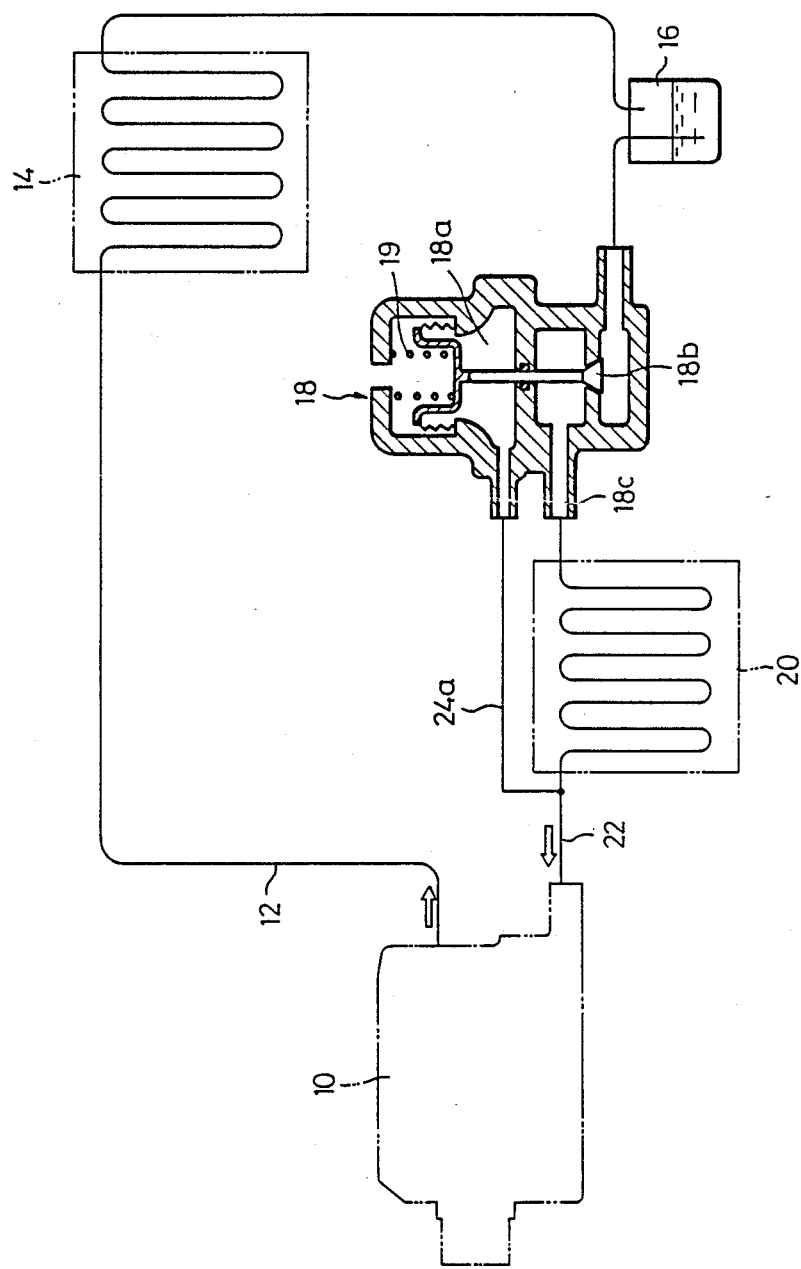
FIG. 1 is a schematic view showing a refrigerating circuit including an expansion valve according to an embodiment of the present invention.

FIG. 1 is a schematic view showing a refrigerating circuit of the present invention. In the figure, a continuously variable displacement refrigerant compressor 10 (hereinafter referred to as the compressor) indicated by a two-dot chain line is driven by an engine. The compressor 10 is provided with a discharge conduit 12 from which a closed refrigerant circuit is extended. In the closed refrigerant circuit a condenser 14, a refrigerant receiver 16, an expansion valve 18, and an evaporator 20 are arranged in series, and a suction conduit 22 is extended from the evaporator 20 to the compressor 10.

As schematically shown in the figure, the expansion valve 18 is a conventional expansion valve having a pressure chamber 18a and a spring 19, the spring force of which can be adjusted by an adjusting device (not shown). An outlet pressure of the evaporator 20 is introduced into the pressure chamber 18a of the expansion valve 18, through an equalizing pipe 24a, and the introduced pressure is balanced by the spring force of the spring 19 to adjust an opening of a valve portion 18b of the expansion valve 18.

Note, instead of receiving the outlet pressure of the evaporator 20 through the equalizing pipe 24a, the pressure chamber 18a may directly receive an inlet pressure of the evaporator 20 via a refrigerant outlet 18c of the expansion valve 18.

Figure 2:
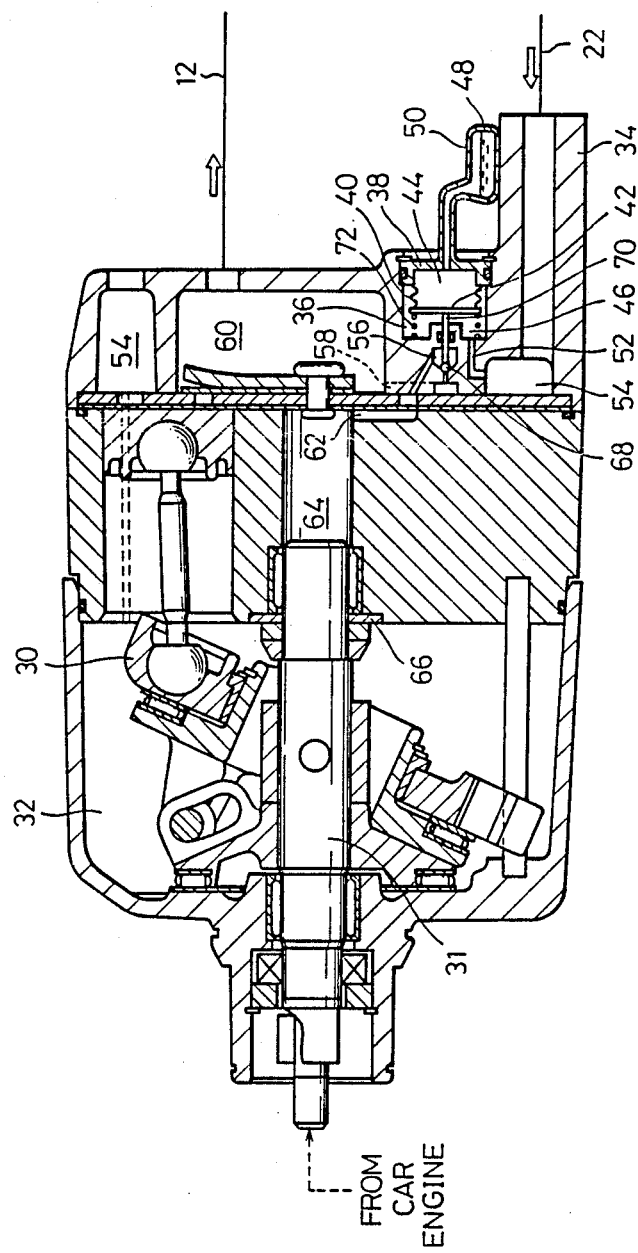
FIG. 2 is a sectional view showing a compressor of the embodiment of FIG. 1.
Figure 3:
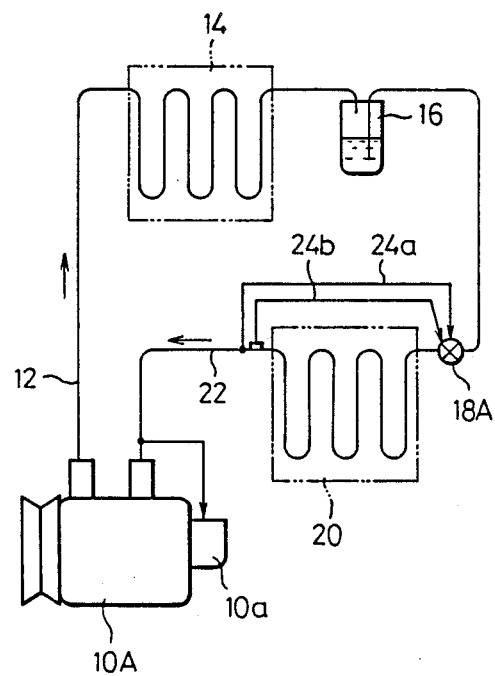
FIG. 3 is a view showing a refrigerating circuit according to a prior art.

FIG. 2 is a view of the compressor 10, which is a wobble plate type provided with a continuously variable displacement mechanism. Since the basic structure and functions of this type of compressor are known, only the parts that are essential to the present invention will be explained below.

A displacement of the compressor 10 is determined by the angle of a wobble plate 30 with respect to a plane perpendicular to the axis of a driving shaft 31, and this angle of the wobble plate 30 changes in inverse proportion to a pressure in a crankcase chamber 32. Namely, the displacement decreases as the pressure in the crankcase chamber 32 increases, and increases as the pressure in the crankcase chamber 32 decreases. The pressure in the crankcase chamber 32 is adjusted by a valve device, such as a mechanical control valve mechanism, activated in response to a detected superheating temperature of the suction refrigerant.

The details of the control valve mechanism and accompanying components will be now explained.

A receiving space 36 is recessed in the vicinity of a suction portion 34 of the compressor 10. This receiving space 36 is a cylindrical hole closed at one end, and is sealed with a cap 38. A bellows 40, to which a partition plate 42 is attached, is fixed to an inner end face of the cap 38, and accordingly, the receiving space 36 is divided into two closed spaces, i.e., a pressure converting chamber 44 and a pressure introducing chamber 46, by the bellows 40 and partition plate 42.

A thermosensitive cylinder 48 containing the same refrigerant as that circulating in the refrigerating circuit is provided for the suction portion 34, and the thermosensitive cylinder 48 and the pressure converting chamber 44 are connected to each other through a sealed pipe 50 to form a closed circuit. The pressure introducing chamber 46 communicates with a suction chamber 54 through a passage 52.

A valve chamber 56 is formed behind a bottom wall of the pressure introducing chamber 46, and this valve chamber 56 communicates with a discharge chamber 60 through a passage 58, and with the crankcase chamber 32 through passages 62, 64, and 66.

A valve seat aligned with a spherical plug 68 is formed at a connection between the valve chamber 56 and the passage 58. The spherical plug 68 is engaged with the partition plate 42 via a lever 70, and therefore, one side of the partition plate 42 is subjected to the resultant force of a pressure in the pressure introducing chamber 46 and a force of a spring 72 disposed in the pressure introducing chamber 46, and the other side of the partition plate 42 is subjected to a pressure in the pressure converting chamber 44, i.e., a saturation pressure of the refrigerant contained in the thermosensitive cylinder 48. An opening between the valve seat and the spherical plug 68 is adjusted by balancing both pressures.

In the case of the previously-described prior art, a superheating temperature of the refrigerant at the outlet of the evaporator 20 is controlled to about 10° C. (a locally superheated state may occur in the evaporator).

Conversely, the expansion valve 18 of the refrigerating circuit of the present invention controls an evaporating pressure, i.e., a saturation temperature, in the evaporator 20 to a set pressure, regardless of a cooling load. This set pressure may be adjusted such that the refrigerant is not overheated even if the cooling load is at an upper limit, and that a stable saturation state is maintained for an entire area of the evaporator 20. Accordingly, the superheating temperature of the refrigerant at the outlet of the evaporator 20 tends to change slightly on the lower side.

As described previously, the circulating refrigerant is adversely influenced due to the length of the suction conduit 22 between the evaporator 20 and the compressor 10, as well as an ambient temperature.

To solve this problem, the present invention detects the superheating temperature of the refrigerant influenced by the above-mentioned external factors, through the control valve mechanism including the thermosensitive cylinder 48 disposed in the vicinity of the suction portion 34 of the compressor 10, and a displacement of the compressor 10 is changed in response to a result of the detection, to maintain the superheating temperature at a constant value.

Namely, a saturation pressure of the refrigerant contained in the thermosensitive cylinder 48 is changed in accordance with a change of the temperature of the thermosensitive cylinder 48, and the saturation pressure is introduced into the pressure converting chamber 44 through the sealed pipe 50. The pressure introducing chamber 46 receives suction refrigerant from the suction conduit 22 through the suction chamber 54, and a pressure of the suction refrigerant introduced into the chamber 46 cooperates with the spring 72 to generate a resultant resisting force against the pressure in the pressure converting chamber 44 behind the partition plate 42.

Therefore, if the superheating temperature of the suction refrigerant is higher than a set value, the pressure in the pressure converting chamber 44 overcomes the resultant force of the pressure in the pressure introducing chamber 46 and the force of the spring 72, to expand the bellows 40, and as a result, the separation plate 42, the lever 70, and the spherical plug 68 are pushed toward the valve seat to narrow the valve opening, whereby discharge refrigerant supplied to the crankcase chamber 32 from the discharge chamber 60 through the passage 58 and valve chamber 56 is gradually restricted. Accordingly, a pressure in the crankcase chamber 32 is decreased to increase an angle of the wobble plate 30, thus increasing the displacement and suppressing the superheating temperature.

On the other hand, if the superheating temperature of the suction refrigerant falls below the set value, the resultant force of the pressure in the pressure introducing chamber 46 and the force of the spring 72 overcomes the pressure in the pressure converting chamber 44, to deflate the bellows 40, and accordingly, the spherical plug 68 is moved away from the valve seat to increase the valve opening, to thereby increase an amount of discharge refrigerant supplied from the discharge chamber 60 to the crankcase chamber 32 through the passage 58, valve chamber 56, and passages 62, 64, and 66. As a result, the pressure in the crankcase chamber 32 is increased, to decrease the angle of the wobble plate 30, thus reducing the displacement and raising the superheating temperature.

In the above embodiment, the thermosensitive cylinder 48 is disposed in the vicinity of the suction portion 34 of the compressor 10, to correctly reflect a temperature of the suction refrigerant, but the thermosensitive cylinder 48 may be placed in the vicinity of a discharge portion of the compressor 10. Also, it is possible to transfer a temperature of the discharge conduit 12 through a coil, etc., to the thermosensitive cylinder 48 disposed in the vicinity of the suction portion 34, to make the suction refrigerant temperature relatively low and thus more effectively prevent overheating of the compressor 10.

In summary, the refrigerating circuit of the present invention maintains an evaporating pressure at a constant value by using an expansion valve, as well as controlling a superheating temperature of the suction refrigerant by continuously changing the displacement of a compressor. Therefore, changes in the pressure of an evaporator may be suppressed, and an entire area of the evaporator may be used under a saturated state, to thereby stabilize the temperature of the evaporator and maintain a desired air conditioning state.

In addition, overheating and a resultant lack of lubrication of the compressor due to an abnormal overheating of refrigerant to be sucked by the compressor, is prevented.

Further, any lowering of the refrigerating efficiency, due to an increase of the specific volume, is prevented.

We claim:

1. In a closed refrigerating circuit for a car air conditioning system for circulating a refrigerant through a variable displacement refrigerant compressor to compress the refrigerant, a condenser for condensing the refrigerant after compression, a refrigerant receiver for storing the liquid refrigerant after condensation, an expansion valve for regulating the flow of the refrigerant after condensation, and an evaporator for effecting a heat exchange between air for cooling a car compartment and the refrigerant flowing from the expansion valve, and a suction conduit connecting an evaporator outlet with a suction portion of the variable displacement refrigerant compressor the improvement which comprises:

a first means which cooperates with said expansion valve for controlling the flow of the refrigerant flowing therethrough to maintain a pressure in the evaporator at a constant value; and a means for continuously varying the compressor displacement of the variable displacement compressor having incorporated therein a second means for maintaining a superheating temperature of the refrigerant, before compression, entering the variable displacement compressor from the evaporator, at a constant value.

2. A closed refrigerating circuit for a car air conditioning according to claim 1, wherein said means for continuously varying the compressor displacement is operated through a valve means for detecting a pressure difference between a saturation pressure in a thermosensitive cylinder disposed in the vicinity of a refrigerant inlet port of said variable displacement refrigerant compressor and a pressure of said refrigerant reaching said refrigerant inlet port of said variable displacement refrigerant compressor.

3. A closed refrigerating circuit for a car air conditioning system according to claim 1, wherein said means for continuously varying the compressor displacement is operated through a valve means for detecting a pressure difference between a saturation pressure in a thermosensitive cylinder arranged to sense a temperature of said of said refrigerant discharged from said variable displacement refrigerant compressor.

4. A closed refrigerating circuit for a car air conditioning according to claim 1, wherein said first means provided for said expansion valve comprises a valve member for openably closing a refrigerant passageway arranged between said refrigerant receiver and an inlet of said evaporator, a pressure responsive element having a first pressure sensitive surface to which a predetermined spring pressure is constantly applied and a second pressure sensitive surface to which said valve member is attached, and a pressure introducing conduit means for applying a refrigerant pressure at an outlet of said evaporator to said second surface of said pressure responsive element.

* * * * *